United States Patent
Zapata-Petrov et al.

(10) Patent No.: US 10,878,403 B1
(45) Date of Patent: Dec. 29, 2020

(54) GENERATING PEER BENCHMARK DATASETS

(71) Applicant: MASTERCARD INTERNATIONAL INCORPORATED, Purchase, NY (US)

(72) Inventors: Jose Luis Zapata-Petrov, Greenwich, CT (US); Avyaktanand Tiwary, Gurgaon (IN); Randhir Kumar, Samastipur (IN)

(73) Assignee: Mastercard International Incorporated, Purchase, NY (US)

( * ) Notice: Subject to any disclaimer, the term of this patent is extended or adjusted under 35 U.S.C. 154(b) by 414 days.

(21) Appl. No.: 15/786,650

(22) Filed: Oct. 18, 2017

(51) Int. Cl.
| | |
|---|---|
| *G06Q 20/00* | (2012.01) |
| *G06Q 20/34* | (2012.01) |
| *G06Q 20/24* | (2012.01) |
| *G06Q 30/02* | (2012.01) |

(52) U.S. Cl.
CPC ........... *G06Q 20/347* (2013.01); *G06Q 20/24* (2013.01); *G06Q 20/341* (2013.01); *G06Q 30/0201* (2013.01)

(58) Field of Classification Search
None
See application file for complete search history.

(56) References Cited

U.S. PATENT DOCUMENTS

| | | | | | |
|---|---|---|---|---|---|
| 5,255,182 | A | * | 10/1993 | Adams | G06Q 20/105 379/379 |
| 5,787,404 | A | * | 7/1998 | Fernandez-Holmann | G06Q 20/10 705/17 |
| 5,970,469 | A | * | 10/1999 | Scroggie | G06Q 20/12 705/14.26 |
| 6,254,000 | B1 | * | 7/2001 | Degen | G06Q 20/347 235/379 |
| 6,419,161 | B1 | * | 7/2002 | Haddad | G06Q 20/3437 235/380 |
| 6,490,568 | B1 | * | 12/2002 | O'Mara | G06Q 20/10 705/38 |
| 6,722,573 | B2 | * | 4/2004 | Haddad | G06Q 20/3437 235/379 |
| 7,363,308 | B2 | * | 4/2008 | Dillon | G06F 16/30 707/706 |
| 7,376,618 | B1 | * | 5/2008 | Anderson | G06Q 20/10 705/38 |
| 7,392,224 | B1 | * | 6/2008 | Bauer | G06Q 20/04 705/35 |

(Continued)

*Primary Examiner* — Gurkanwaljit Singh

(74) *Attorney, Agent, or Firm* — Foley & Lardner LLP

(57) ABSTRACT

Methods and systems to generate a peer benchmark dataset comprises receiving a request to generate a deviation value between a payment card and other similar card in the market; querying a first database to receive a first dataset associated with the payment card; querying a second database to receive a second dataset comprising different cards and their respective transaction data; selecting a subset of the cards from the second database based on their spend band and a second characteristic; querying a third database to receive transaction data associated with the selected cards; generating a peer benchmark dataset based on the selected cards and their respective transaction data; and updating a graphical user interface on the client computing device to display the peer benchmark dataset and the first dataset.

17 Claims, 7 Drawing Sheets

| Product Group | Spend Band | | % Cards | % XB | % CP | % CNP | % eCom |
|---|---|---|---|---|---|---|---|
| Card 01 | A) | < $1000 | 8% | 9% | 62% | 38% | 19% |
| Card 01 | B) | $1000 - < $5000 | 11% | 7% | 71% | 29% | 16% |
| Card 01 | C) | $5000 - < $10000 | 12% | 6% | 73% | 27% | 16% |
| Card 01 | D) | $10000 - < $30000 | 28% | 6% | 72% | 28% | 16% |
| Card 01 | E) | $30000 and up | 40% | 5% | 69% | 31% | 18% |
| Card 02 | A) | < $1000 | 17% | 3% | 58% | 42% | 17% |
| Card 02 | B) | $1000 - < $5000 | 29% | 2% | 71% | 29% | 15% |
| Card 02 | C) | $5000 - < $10000 | 17% | 2% | 73% | 27% | 15% |
| Card 02 | D) | $10000 - < $30000 | 24% | 2% | 75% | 25% | 14% |
| Card 02 | E) | $30000 and up | 14% | 2% | 73% | 27% | 16% |
| Card 03 | A) | < $1000 | 10% | 6% | 68% | 32% | 17% |
| Card 03 | B) | $1000 - < $5000 | 37% | 5% | 78% | 22% | 15% |
| Card 03 | C) | $5000 - < $10000 | 19% | 6% | 78% | 22% | 14% |
| Card 03 | D) | $10000 - < $30000 | 22% | 5% | 77% | 23% | 14% |
| Card 03 | E) | $30000 and up | 12% | 4% | 73% | 27% | 17% |
| Card 04 | A) | < $1000 | 34% | 2% | 62% | 38% | 19% |
| Card 04 | B) | $1000 - < $5000 | 35% | 2% | 70% | 30% | 18% |
| Card 04 | C) | $5000 - < $10000 | 13% | 1% | 73% | 27% | 17% |
| Card 04 | D) | $10000 - < $30000 | 13% | 1% | 76% | 24% | 15% |
| Card 04 | E) | $30000 and up | 4% | 1% | 75% | 25% | 16% |

400

(56) References Cited

U.S. PATENT DOCUMENTS

| | | | | |
|---|---|---|---|---|
| 7,653,572 B1* | 1/2010 | Thompson | G06Q 30/02 | 705/14.34 |
| 8,095,498 B2* | 1/2012 | Rollins | G06Q 10/10 | 707/600 |
| 2002/0040925 A1* | 4/2002 | Weber | G06Q 20/02 | 235/379 |
| 2002/0082920 A1* | 6/2002 | Austin | G06Q 30/02 | 705/14.25 |
| 2002/0116264 A1* | 8/2002 | Feidelson | G06Q 20/387 | 705/14.17 |
| 2002/0117541 A1* | 8/2002 | Biggar | G06Q 20/105 | 235/379 |
| 2003/0018613 A1* | 1/2003 | Oytac | G06Q 30/02 | |
| 2003/0093314 A1* | 5/2003 | Leung | G06Q 30/02 | 705/14.13 |
| 2003/0229584 A1* | 12/2003 | Brown | G06Q 20/04 | 705/39 |
| 2004/0044571 A1* | 3/2004 | Bronnimann | G06Q 30/02 | 705/14.71 |
| 2004/0122736 A1* | 6/2004 | Strock | G06Q 30/02 | 705/14.31 |
| 2004/0181453 A1* | 9/2004 | Ray | G06Q 20/20 | 705/16 |
| 2004/0199422 A1* | 10/2004 | Napier | G06Q 20/10 | 705/14.7 |
| 2005/0086112 A1* | 4/2005 | Shkedi | G06Q 30/02 | 705/14.61 |
| 2005/0105513 A1* | 5/2005 | Sullivan | H04L 29/12018 | 370/352 |
| 2005/0222906 A1* | 10/2005 | Chen | G06Q 30/02 | 705/14.41 |
| 2005/0240477 A1* | 10/2005 | Friday | G06Q 30/02 | 705/14.33 |
| 2006/0122879 A1* | 6/2006 | O'Kelley | G06Q 30/00 | 705/14.46 |
| 2006/0143072 A1* | 6/2006 | Herman | G06Q 30/02 | 705/14.52 |
| 2006/0255137 A1* | 11/2006 | Wagner | B07C 7/005 | 235/385 |
| 2007/0143172 A1* | 6/2007 | Bhagchandani | G06Q 30/0261 | 705/14.52 |
| 2007/0291739 A1* | 12/2007 | Sullivan | G06Q 30/02 | 370/352 |
| 2009/0248506 A1* | 10/2009 | Goldstein | G06Q 30/02 | 705/14.27 |
| 2010/0153332 A1* | 6/2010 | Rollins | G06Q 10/10 | 707/603 |

* cited by examiner

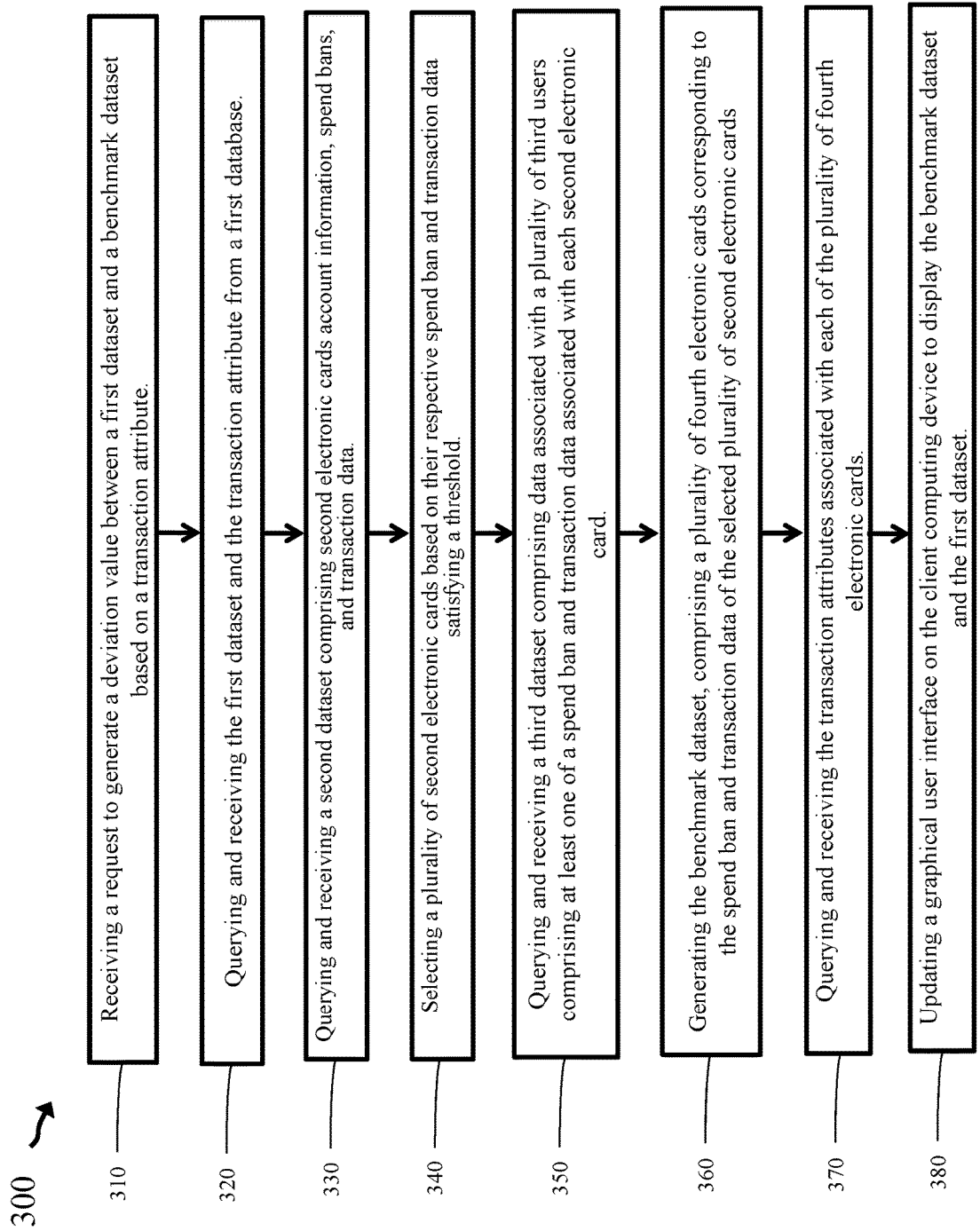

| Product Group | | Spend Band | % Cards | % XB | % CP | % CNP | % eCom |
|---|---|---|---|---|---|---|---|
| Card 01 | A) | < $1000 | 8% | 9% | 62% | 38% | 19% |
| Card 01 | B) | $1000 - < $5000 | 11% | 7% | 71% | 29% | 16% |
| Card 01 | C) | $5000 - < $10000 | 12% | 6% | 73% | 27% | 16% |
| Card 01 | D) | $10000 - < $30000 | 28% | 6% | 72% | 28% | 16% |
| Card 01 | E) | $30000 and up | 40% | 5% | 69% | 31% | 18% |
| Card 02 | A) | < $1000 | 17% | 3% | 58% | 42% | 17% |
| Card 02 | B) | $1000 - < $5000 | 29% | 2% | 71% | 29% | 15% |
| Card 02 | C) | $5000 - < $10000 | 17% | 2% | 73% | 27% | 15% |
| Card 02 | D) | $10000 - < $30000 | 24% | 2% | 75% | 25% | 14% |
| Card 02 | E) | $30000 and up | 14% | 2% | 73% | 27% | 16% |
| Card 03 | A) | < $1000 | 10% | 6% | 68% | 32% | 17% |
| Card 03 | B) | $1000 - < $5000 | 37% | 5% | 78% | 22% | 15% |
| Card 03 | C) | $5000 - < $10000 | 19% | 6% | 78% | 22% | 14% |
| Card 03 | D) | $10000 - < $30000 | 22% | 5% | 77% | 23% | 14% |
| Card 03 | E) | $30000 and up | 12% | 4% | 73% | 27% | 17% |
| Card 04 | A) | < $1000 | 34% | 2% | 62% | 38% | 19% |
| Card 04 | B) | $1000 - < $5000 | 35% | 2% | 70% | 30% | 18% |
| Card 04 | C) | $5000 - < $10000 | 13% | 1% | 73% | 27% | 17% |
| Card 04 | D) | $10000 - < $30000 | 13% | 1% | 76% | 24% | 15% |
| Card 04 | E) | $30000 and up | 4% | 1% | 75% | 25% | 16% |

| Product Group | | Spend Band | % Cards | % XB | % CP | % CNP | % eCom |
|---|---|---|---|---|---|---|---|
| Card 05 | A) | <$1000 | 24% | 2% | 81% | 19% | 13% |
| Card 05 | B) | $1000 - <$5000 | 35% | 1% | 81% | 19% | 13% |
| Card 05 | C) | $5000 - <$10000 | 15% | 1% | 81% | 19% | 13% |
| Card 05 | D) | $10000 - <$30000 | 19% | 1% | 80% | 20% | 13% |
| Card 05 | E) | $30000 and up | 7% | 1% | 77% | 23% | 16% |
| Card 06 | A) | <$1000 | 37% | 2% | 49% | 51% | 20% |
| Card 06 | B) | $1000 - <$5000 | 38% | 1% | 62% | 38% | 21% |
| Card 06 | C) | $5000 - <$10000 | 13% | 1% | 67% | 33% | 20% |
| Card 06 | D) | $10000 - <$30000 | 10% | 1% | 72% | 28% | 18% |
| Card 06 | E) | $30000 and up | 2% | 1% | 73% | 27% | 17% |
| Card 07 | A) | <$1000 | 27% | 2% | 59% | 41% | 18% |
| Card 07 | B) | $1000 - <$5000 | 34% | 1% | 70% | 30% | 17% |
| Card 07 | C) | $5000 - <$10000 | 17% | 1% | 75% | 25% | 14% |
| Card 07 | D) | $10000 - <$30000 | 19% | 1% | 78% | 22% | 13% |
| Card 07 | E) | $30000 and up | 3% | 1% | 76% | 24% | 15% |
| Card 08 | A) | <$1000 | 42% | 2% | 67% | 33% | 18% |
| Card 08 | B) | $1000 - <$5000 | 40% | 2% | 70% | 30% | 19% |
| Card 08 | C) | $5000 - <$10000 | 11% | 2% | 70% | 30% | 19% |
| Card 08 | D) | $10000 - <$30000 | 6% | 1% | 71% | 29% | 19% |
| Card 08 | E) | $30000 and up | 1% | 2% | 70% | 30% | 20% |

| Spend Band | Actual | | | After 5-25% compliance | |
|---|---|---|---|---|---|
| | % Cards | Cards | SPAC (old) | % Base | SPAC (new) |
| Card Issuer 01 | 49% | 178,273 | 10,732 | 25% | 10,732 |
| Card Issuer 02 | 39% | 143,159 | 8,277 | 25% | 8,277 |
| Card Issuer 03 | 6% | 21,894 | 4,759 | 24% | 4,759 |
| Card Issuer 04 | 5% | 17,226 | 6,506 | 19% | 6,506 |
| Card Issuer 05 | 2% | 6,482 | 10,066 | 7% | 10,066 |
| Weighted Average | | 367,034 | 9,208 | | 7,839 |
| Mean | | | 8,068 | | |
| Standard Deviation | | | 2,214 | | |
| Coefficient of Variation (CoV) | | | 27% | | |

GENERATING PEER BENCHMARK DATASETS

TECHNICAL FIELD

This application relates generally to generating and manipulating datasets associated with efficient analytics processing.

BACKGROUND

As the processing power of computers allow for greater computer functionality and the Internet technology era allows for interconnectivity between computing systems, card issuers rely on highly complex computer infrastructures to facilitate transactions using payment cards. Currently, various computer environments allow a card processing computing system to receive card identifiers from a merchant (e.g., via an electronic point of sale device or through a computing device when users conduct online shopping) and to process the payment by debiting the user's account with the card issuing computing system, and crediting an account associated with the merchant. Large volumes of data generated when using different payment cards (at each of the above-mentioned steps) and customers' expectation of faster payment processing has rendered the use of computers a necessity when facilitating payments and transactions.

Many card issuers have a growing desire to compare their products with other products in the market (e.g., different cards issued by other card issuers). However, existing and conventional methods providing benchmarks of payment cards have not been satisfactory due to technical and other shortcomings. For example, existing and conventional methods fail to provide fast and efficient analysis of transaction data associated with different products due to a high volume of customer information existing on different networks and computing infrastructures. Managing such information on different platforms is difficult due to number, size, content, or relationships of the data associated with the customers. As a result, currently, many card processing computing systems do not provide accurate and efficient comparisons between products. Additionally, many card processing computing systems do not have the technical capability to use and/or share proprietary information of card issuers and card holders. For example, a card processing computing system may not share transaction attributes of a cardholder (e.g., type of the card, spend band, and other transaction data) or may not allow transaction data to be shared with other entities. Therefore, there is a desire for a computing technology and a software solution to address these challenges.

SUMMARY

For the aforementioned reasons, there is a need for a more efficient and faster system and method for processing large user datasets and generating peer benchmark datasets, which would allow institutions to compare their products against other products in the market in a more efficient manner than possible with conventional computer data-driven analysis or any solution not involving a computer. There is a need for a network and computer-specific set of rules to produce efficient and accurate results when facing a high number of datasets.

In an embodiment, a method comprises receiving, by a server, from graphical user interface displayed on a client computing device, a request to generate a benchmark dataset, wherein the request comprises at least a first electronic card associated with a plurality of first users, wherein the first electronic card is associated with a first database; querying, by the server, the first database to receive a first dataset, wherein the first dataset comprises transaction data corresponding to the first electronic card; upon querying the first database, receiving, by the server, the first dataset; querying, by the server, a second database to receive a second dataset, wherein the second dataset comprises transaction data corresponding to a plurality of second electronic cards associated with a plurality of second users and further comprises at least one of an account number associated with each second user, electronic card identifiers, account status, and spend band value, associated with each second electronic card, wherein each second electronic card is associated with the second database, wherein the server is prohibited from sharing the electronic card identifier associated with the each of the second electronic cards with any computing device not authorized by the second database; upon querying the second database, receiving, by the server, the second dataset; selecting, by the server, a plurality of selected second electronic cards based on their respective spend band value and transaction data satisfying a first threshold; querying, by the server, one or more third databases to receive a third dataset, wherein the third dataset comprises data corresponding to a plurality of third electronic cards associated with a plurality of third users comprising at least one of a spend band value and transaction data associated with each selected second electronic card, wherein each third electronic card is associated with a third database within the one or more third databases, wherein each third electronic card is associated with a card identifier and the server is prohibited from sharing the electronic card identifier associated with the each of the third electronic cards with any computing device not authorized by the third database; generating, by the server, the benchmark dataset comprising a plurality of fourth electronic cards comprising a spend band value and transaction data corresponding to the spend band value and transaction data of the plurality of selected second electronic cards, wherein the benchmark dataset is a subset of the third dataset and each fourth electronic card satisfies a second threshold, wherein the benchmark dataset comprises a second card identifier containing at least a portion each third electronic card identifier; and updating, by the server, the graphical user interface on the client computing device to display the benchmark dataset and the first dataset.

In another embodiment, a computer system comprises a server, which is configured to receive from graphical user interface displayed on a client computing device, a request to generate a benchmark dataset, wherein the request comprises at least a first electronic card associated with a plurality of first users, wherein the first electronic card is associated with a first database; query the first database to receive a first dataset, wherein the first dataset comprises transaction data corresponding to the first electronic card; upon querying the first database, receive the first dataset; query a second database to receive a second dataset, wherein the second dataset comprises transaction data corresponding to a plurality of second electronic cards associated with a plurality of second users and further comprises at least one of an account number associated with each second user, electronic card identifiers, account status, and spend band value, associated with each second electronic card, wherein each second electronic card is associated with the second database, wherein the server is prohibited from sharing the electronic card identifier associated with the each of the second electronic cards with any computing device not authorized by the second database; upon querying the second database, receive the second dataset; select a plurality of selected second electronic cards based on their respective spend band value and transaction data satisfying a first threshold; query one or more third databases to receive a third dataset, wherein the third dataset comprises data corresponding to a plurality of third electronic cards associated with a plurality of third users comprising at least one of a spend band value and transaction data associated with each selected second electronic card, wherein each third electronic card is associated with a third database within the one or more third databases; generate the benchmark dataset comprising a plurality of fourth electronic cards comprising a spend band value and transaction data corresponding to the spend band value and transaction data of the plurality of selected second electronic cards, wherein the benchmark dataset is a subset of the third dataset and each fourth electronic card satisfies a second threshold, wherein the benchmark dataset comprises a second card identifier containing at least a portion each third electronic card identifier; and update the graphical user interface on the client computing device to display the benchmark dataset and the first dataset.

In yet another embodiment a computer-implemented method of automatically comparing electronic card performance with similar electronic cards comprises a computer system having one or more processors, performing the operations of receiving a request to display a comparison, wherein the request comprises at least a first electronic card associated with a plurality of first users, wherein the first electronic card is associated with a first database; accessing a first dataset stored on the first database, wherein the first dataset comprises transaction data corresponding to the first electronic card; accessing a second dataset stored on a second database comprising a plurality of second electronic cards associated with a plurality of second users; for each second electronic card: identifying transaction data comprising at least one of an account number associated with each second user, electronic card identifiers, account status, and spend band value, associated with each second electronic card, wherein each second electronic card is associated with the second database, wherein the server is prohibited from sharing the electronic card identifier associated with the each of the second electronic cards with any computing device not authorized by the second database; partitioning the second electronic cards into a first cluster of electronic cards by applying a first threshold to the spend band value and transaction data of each second electronic card; accessing a third dataset stored on a third database comprising a plurality of third electronic cards corresponding to the first cluster of electronic cards; partitioning each electronic card within the first cluster of electronic cards into a second cluster of electronic cards by applying a second threshold to a respective spend band value and transaction data of each respective electronic card within the first cluster of electronic cards; causing the second cluster of electronic cards and the first dataset to be displayed on the graphical user interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 3 illustrates a flowchart depicting operational steps of generating a peer benchmark dataset, according to an embodiment.

FIG. 4A-B illustrate a received dataset comprising data associated with different payment cards from a participating card issuing computing system, according to an embodiment.

FIG. 5 illustrates a generated peer benchmark dataset, according to an embodiment.

DETAILED DESCRIPTION

Figure 1:
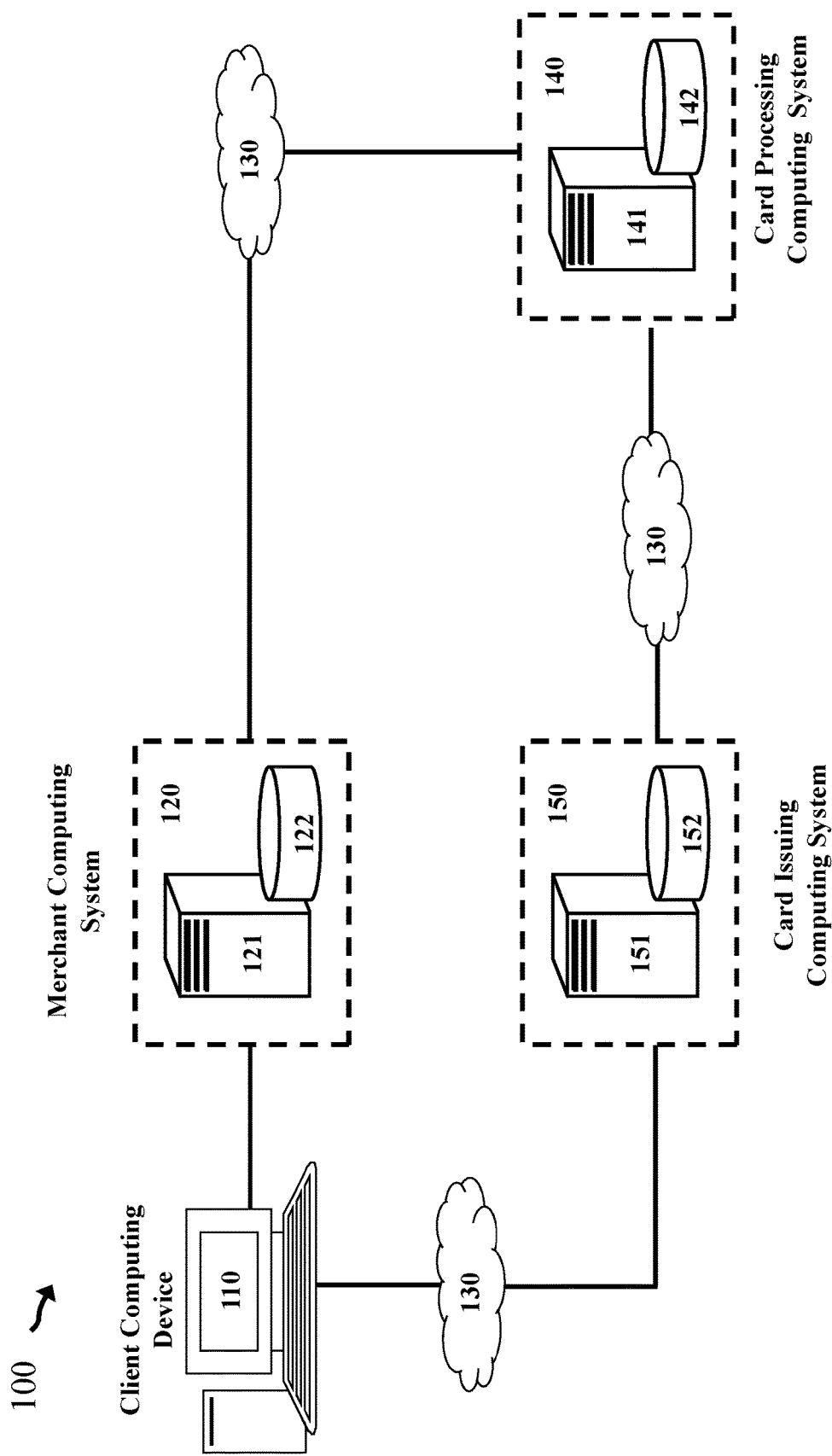
FIG. 1 illustrates an example of a payment system for facilitating a payment using a payment card, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 is a schematic diagram that illustrates an overview example of key components and the data flow between key components of a computer-implemented payment system configured to facilitate a payment using a payment card (e.g., credit card). The system 100 comprises client computing device 110, merchant computing system 120, card processing computing system 140, card issuing computing system 150, and network 130 that allows different computing systems of the system 100 to communicate with each other. As used herein, "card," "electronic card," and "payment card" refer both to physical payment cards, and more generally, to electronic payment accounts that may not utilize a physical card to complete a financial transaction, such as electronic wallets and other electronic payment applications.

As a non-limiting example of a payment with an electronic payment card, when a transaction is initiated (e.g., a client operating the client computing device 110 has initiated transferring money to a merchant operating the merchant computing device), the merchant computing system 120 receives information of a payment card issued by the card issuing computing system 150 (e.g., credit card and the like). In an example, the merchant computing system 120 may provide a graphical user interface and receive a payment card identifier from a client via the client computing device 110 (e.g., the merchant is an online shopping website). The merchant computing system 120 may comprise an internal database 122 and a server 121 to acquire/store the card identifier and transmit data to the card processing computing system 140. The payment card identifier may be a 16-digit credit card number or any other card number issued by the card issuing computing system 150. In other embodiments, the merchant computing system 120 may provide a Point of Sale (POS) terminal or any other computing devices to acquire the payment card identifier from the card itself using a variety of existing methods such as a magnetic strip located on or attached to the payment card. The merchant computing system 120 may transfer the card payment identifier (via network 130) to the card processing computing system 140. The card processing computing system 140 may then (via the server 141) identify the card issuing computing system 150 based on the card identifier, a transaction amount from the merchant computing system 120, and authenticate/validate the identity of the client (or the client computing device 110) and store said data in an internal database 142. Upon validating the transaction, the card processing computing system 140 may approve the transaction and may query an account record of the client within the card issuing computing system 150 (e.g., data storage 152). The card issuing computing system 150 (via the server 151) may approve the transaction by determining whether the client's account has a sufficient balance to accommodate the transaction. For example, upon the client account having a sufficient balance, the card issuing computing system 150 may transmit a signal to the card processing computing system 140 and approve the transaction. The card processing computing system 140 may then generate an instruction to debit the client's account and transmit the instruction to the card issuing computing system 150. The card processing computing system may also generate another instruction to credit an account associated with the merchant computing system 120 and transmit the second instruction to a financial institution computing system (not shown here) associated with the merchant computing system 120. In some embodiments, the card processing computing system 140 may approve transactions that satisfy a certain thresholds (e.g., transaction amounts less than a pre-determined value or a client who satisfies a certain criteria such as a high value client or a client with a payment card associated with a high spend band). The card processing computing system 140 may then issue debit instructions and transmit the debit instructions to the card issuing computing system 150 in batches and at a later time (e.g., predetermined period). Key components illustrated in FIG. 1 represent the existing computing system to facilitate payments using payment card. The present disclosure provides a computer-implemented method to improve a computer infrastructure. A non-limiting example of the computer infrastructure that could benefit from the method disclosed herein is the system 100.

Figure 2:
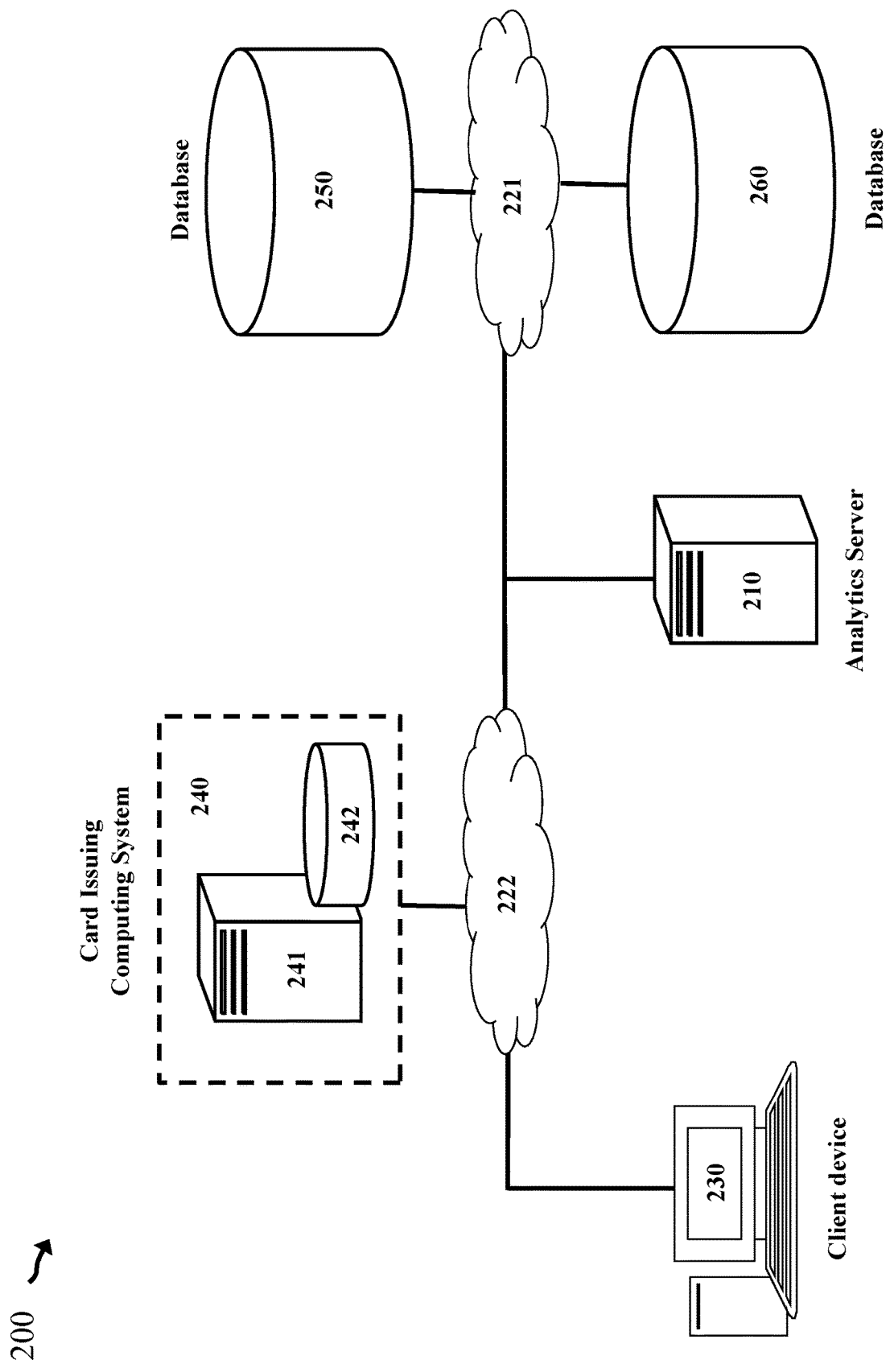
FIG. 2 illustrates an example of a system for generating a peer benchmark dataset, according to an embodiment.

FIG. 2 illustrates components of a system 200, according to an exemplary embodiment. The system 200 comprises an analytics server 210 associated with a payment processing computing system such as the card processing computing system 140 illustrated in FIG. 1, a database server 241 and a database 242 associated with a card issuing computing system 240, communication network 221-22, client device 230, and database 250 and 260. The client device 230 may communicate with the analytics server 210 via the communication network 222, such as the Internet or any other public or private network. The client device 230 may also be in connection with the card issuing computing system 240 via the analytics server 210. The client device may also be in direct connection (or be a part of) the card issuing computing system 240 via the communication network 222. For example, an administrator associated with the card issuing computing system 240 may operate the client device 230.

In operation, the client device 230 may request the analytics server 210 to derive various forms of analytical information from the data records of the database 250 and/or 260 and may request the data derived be analyzed (e.g., compared with) other data stored within the database 242. In some embodiments, the client device 230 may be (legally or technically) prevented from accessing data from either of the databases (250 and/or 260) and the analytics server 210 may also be prevented from sharing any proprietary raw data from either database 250 and/or database 260 with the client device 230 and/or any computing device associated with card issuing computing system 240. In some embodiments, the analytics server 210 may use different networks (e.g., network 221 and/or 222) to communicate and transmit only derived data to the client device 230, card issuing computing system 240, database 250, and database 260 in order to avoid granting access to either of the above-mentioned computing devices to the data stored within any of the computing devices described in FIG. 2. For example, the client device 230 may be operated by an administrator or a client of the card issuing computing system 240 and the analytic server 210 may not be able to share raw data of database 250 or database 260 with the client device 230 because database 250 and 260 may be associated (and contain) data associated with other card issuing computing systems not shown in FIG. 1. The analytics server 210, however, may share anonymized and derived data (e.g., a peer benchmark dataset) using the raw data available and stored in database 250 and/or 260 with the client device 230 or any other computing device associated with the card issuing computing system 240.

The client device 230 may access a web-based service, a graphical user interface, or an application hosted by the analytics server 210, from which the administrator operating the client device 230 may provide various types of data and request a peer benchmark dataset to be generated and compared with data stored in database 242. In some embodiments, the analytics server 210 may host an application server or a special graphical user interface, which may comprise software modules allowing client device 230 to access and manipulate data, and provide instructions to the analytics server 210. For example, the analytics server 210 may comprise a webserver allowing client device 230 to access anonymized data that is collected and manipulated by an analytics service offered by an institution associated with the analytics server 210. In this example, a user operating the client device 230 may point a web browser application executed by the client device 230 to a website hosted on the webserver (or otherwise by the analytics server 210) in order to access the analytics service and view the results. The user may instruct the analytics server 210 to access various forms of data and input to the analytics server 210 the parameters needed to determine an appropriate peer benchmark. In another example where the analytics server 210 comprises a webserver hosting a web-accessible application, the client device 230 may be a mobile device (e.g., tablet, laptop, smart phone) executing a software application provided and executed by the analytics server 210. In this example, the user may use the mobile application to provide instructions to the analytics server 210, and to review outputted user interfaces on the mobile device.

Figure 6:
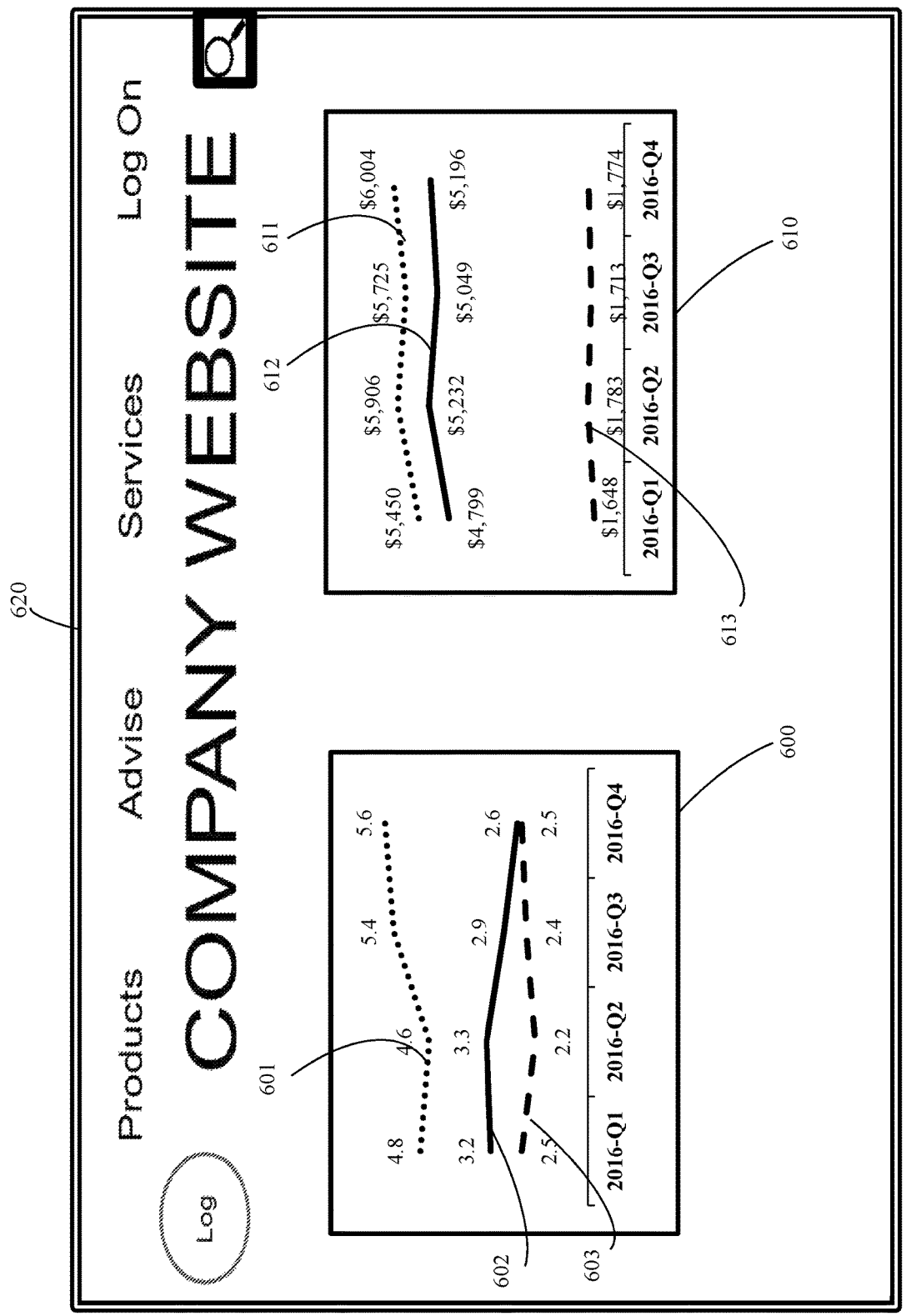
FIG. 6 illustrates different comparison data displayed on a graphical user interface of a client computing device, according to an embodiment.

The webserver may have access to one or more databases or pre-stored web-based interfaces, such as webpages, comprising a number of preconfigured sub-interfaces 600 and 610 (as shown in FIG. 6), or containers, dynamically populated from the data analyzed and anonymized by the analytics server 210. For example, webpages may contain code, such as HTML or PHP, presenting a website of any number of webpages having a common "look-and-feel." One or more output or results display webpages may contain additional code for containers, where the container code displays information or data that is configured to be dynamically and continuously generated using ongoing analysis. In this example, the data may be comparisons of the performance of a particular card (e.g., received from the client device 230) relative to similar cards in the market. The webserver may make calls to the records of an analytics database (e.g., any database associated with the analytics server 210) in order to populate the sub-interfaces 600 and 610 of the output webpage with the appropriate data, while the webpage display is configured to maintain the website's common aesthetic.

The client device 230 may be any computing device comprising a processor capable of performing the various tasks and processes described herein. Non-limiting examples of a client device 230 may include a server, desktop, laptop, tablet, and the like. The client device 230 comprises any number of computer-networking components (e.g., network interface card) that facilitate inter-device communications via the communication network 222. Although the communication network 221 and 222 are shown as separate and distinct communication networks, one having skill in the art would appreciate that in some embodiment, a single communication network may connect all the computing devices described in FIG. 1 and the analytics server 210 may use variety of known methods to separate the proprietary data of different computing systems.

The card issuing computing system 240 may be an institution that issues an electronic payment apparatus such a credit card or any other electronic payment cards to different users and card holders. As described above, the card issuing computing system 240 may be prevented from accessing other card issuing computing devices associated with database 250 and 260. However, the analytics server 210 may provide a special user interface (on the client device 230) that provides a benchmark dataset in order to illustrate performance of any particular payment card issued by the card issuing computing system 240 relative to the performance of other payment cards issued by other card issuing institutions (associated with database 250 and/or 260). The database 242 may contain any data associated with the users (e.g., services provided to the cardholders, payment information, transaction data and attributes, payment type, each card issued to the cardholders, spend band, percentage of payment in person, percentage of online payments, and the like) and may be hosted on any number of computing devices comprising a non-transitory machine-readable storage medium capable of storing data records received from the database server 241, and in some cases, received from the analytics server 210, the client device 230, or other computing devices (e.g., websites or cloud service providers). The database 242 may further comprise a processor capable of executing various queries and data record management processes, according to instructions from the analytics server 210 or the database server 241. One having skill in the art would appreciate that the database 242 may be the same computing device as the database server 241, or be hosted on a distinct computing device that is in networked-communication with the analytics server 210. The database server 241 may communicate data records and instructions to and from the analytics server 210, where the data records may be stored into the database 242 and where various analytics may be performed on the data by the database server 241 in accordance with the instructions from the analytics server 210 or (indirectly by) the client device 230 via communication network 222. The database server 241 may be any computing device comprising a processor capable of performing the various tasks and processes described herein. Non-limiting examples of the database server 241 may include a server, desktop, laptop, tablet, and the like. The database server 241 comprises any number of computer-networking components (e.g., network interface card) that facilitate inter-device communications via the communication network 222. One having skill in the art would appreciate that there may be any number of distinct computing devices functioning as the database server 241 in a distributed computing environment. The database server 241 may host an online service, such as cloud-computing application service, or any other service that provide customer-facing web-based applications that collect customer data through web-based transactions with the client device 230 over one or more networks such as the communication network 222.

The analytics server 210 may perform various analytics on data records stored in the database 250, 242, and/or 260 and transmit the results to the client device 230. The analytics server 210 may be any computing device comprising a processor capable of performing the various tasks and processes described herein. Non-limiting examples of the analytics server 210 may include a server, desktop, laptop, tablet, and the like. The analytics server 210 comprises any number of computer-networking components, which facilitate inter-device communications via the communication network 221 and/or 222. One having skill in the art would appreciate that there may be any number of distinct computing devices functioning as the analytics server 210 in a distributed computing environment.

The databases 250 and 260 may be associated with different card issuing computing systems other than the card issuing computing system 240. Databases 250 and 260 may store data records that are associated with several users associated with various different cards issued, where the data records each contain at least one field identifying which user account was associated with a particular data field. The databases 250 and/or 260 may store personal attributes and payment data associated with each user such as name, user identifiers (e.g., Social Security numbers, Driver's license number, or other identifiers), payment type, each card issued to the user, spend band, percentage of payment in person, percentage of online payments, and the like. The databases 250 and 260 may also store data records generated, stored, and/or received by the analytics server 210. For example, the analytics server 210 may provide an online accessible graphical user interface configured to receive personal attributes associated with the user or the analytics server may derive raw data from the databases 250 and/or 260 and may store the derived data within said databases.

Referring now to FIG. 3, a flowchart depicting operational steps of generating a peer benchmark dataset is illustrated, in accordance with an embodiment. Steps of the method 300 may be implemented using one or more modules of the analytics server, the client device, and two different institutions. FIG. 3 does not imply any limitations with regards to the environments or embodiments that may be implemented. Modifications to the depicted environment or embodiment shown in FIG. 3 may be made.

At step 310, the analytics server may receive, from a client computing device, a request to generate a deviation value, associated with a transaction attribute, between a first dataset and a benchmark dataset, wherein the first dataset comprises data associated with a first electronic card associated with a plurality of first users and further comprises transaction data associated with each first user. The analytics server may generate a graphical user interface (GUI) comprising a set of input fields and configured to be displayed on the client device. For example, the GUI can include an electronic form for completion by an administrator operating the client device, where the electronic form includes a plurality of graphical elements (e.g., text fields, buttons, sliders, checkboxes, dropdown menus, and the like) for interaction with the client, and where the electronic form may be associated with a profile corresponding to the users (e.g., users to whom a card issuing computing system has issued payment cards). An example of the GUI generated and hosted by the analytics server may be a website. The analytics server may host a website accessible to the end-users (e.g., administrator operating the client device), where the content presented via the various webpages may be controlled based upon each particular user's role. Upon the client, operating the client device, accessing the GUI, the analytics server may receive a request for a comparison between a particular payment card and how similar cards in the market (issued by other card issuing computer systems) are performing.

In an example, the administrator (operating the client device) may log into the website provided by the analytics server and request the analytics server to compare performance of a particular card with other similar cards in the market. The analytics server may also be required to generate a peer benchmark dataset (e.g., a dataset illustrating how similar cards are performing by illustrating different transaction attributes). The analytics server may also receive (via the GUI) card attributes from the client device. Card attributes may refer to attributes associated with a particular electronic payment card, such as spend bands (e.g., a maximum amount of money authorized to be spent by the cardholder), transaction distribution (e.g., percentage of the transactions performed online, and the like). The analytics server may also receive a request to compare a particular attribute of the particular card with other similar card in the market. For example, the request received by the analytics server may require the analytics server to compare the fraudulent transactions with similar card in the market. In other embodiments, the analytics server may be required to compare other performance attributes, such as Spend Per Active Card (SPAC) for users, percentage of declined transactions, and the like.

At step 320, the analytics server may query a first database to receive the first dataset and the transaction attribute associated with each of the plurality of the first electronic cards and the plurality of first users. The analytics server may also, upon querying the first database, receive the first dataset. The analytics server may generate a query instruction configured to receive data from a database. The instruction may be configured to query all data from a database associated with the client device and/or the card issuing computing system that has issued the particular card to be compared with similar cards in the market (e.g., database 242 illustrated in FIG. 2). In an embodiment, the analytics server may query all data associated with the card identified by the client device (received in step 310) and stored in the database associated with the client device. For example, if the analytics server receives a request to analyze the percentage of declined transactions of card XYZ with similar cards in the market, the analytics server may query all data relevant to card XYZ (e.g., spend band, decline transaction instances, number of users to which the card has been issued, number of declined transactions, and the like). The analytics server may use the data received to compare against the newly generated peer benchmark dataset.

At step 330, the analytics server may query a second database (e.g., database 250 illustrated in FIG. 2) to receive a second dataset, wherein the second dataset comprises transaction data corresponding to a plurality of second electronic cards associated with a plurality of second users and further comprises at least one of an account number associated with each second user, electronic card identifiers, account status, and spend band value, associated with each second electronic card, wherein each second electronic card is associated with the second database, wherein the server is prohibited from sharing the electronic card identifier associated with the each of the second electronic cards with any computing device not authorized by the second database. The analytics server may also, upon querying the second database, receive the second dataset. The analytics server may identify a database associated with a participating card issuing computer system (e.g., an issuing computer system that has authorized using the customer and transaction data, such as the database 250 in FIG. 1) and receive different data associated with different cards issued and other pertinent user data. For example, the analytics server may generate a query command to receive all cards issued by the participating card issuing computing system and may query all transaction data associated with each issued card. The dataset received by the analytics server may also contain various confidential information including electronic cards identifiers (e.g., credit card numbers). The analytics server may not be authorized to share this confidential information with any computing device other than the second database (e.g., database 250 illustrated in FIG. 2).

FIG. 4A-B illustrate a received dataset comprising data associated with different payment cards from a card issuing computing system, according to an embodiment. Dataset 400 may represent a dataset received from a participating card issuing computing system. The analytics server may receive the dataset 400 in response to querying all relevant information or all data associated with all the payment cards issued by the participating card issuing computing system. Dataset 400 may comprise product name (e.g., different cards issued by the participating card issuing computing system, such as card 01-08) and the spend band associated with each card. Additionally, dataset 400 may comprise a value representing percentage of the cards, percentage of the cross border transactions (e.g., % XB), a percentage of the transactions in which the cardholder is present (e.g., % CP), a percentage of the transactions that the cardholder is not presents (e.g., telephone transactions or other non-in person transactions or % CNP), and a percentage of the e-commerce transactions (e.g., % eCom), allocated to the each respective spend band. As a non-limiting example, the analytics server may categorize all data associated with card 01 into five different spend bands (e.g., less than $1000, between $1000 and $5000, between $5000 and $10,000, between $10,000 and 30,000, and $30,000 and higher). In some embodiments, the analytics server may modify the spend bands based on each card issuer. Furthermore, the spend bands may also be modified by the client (e.g., the analytics server may receive spend band modifications from the client computing device). The analytics server may then determine what percentage of the total cards corresponds to each spend band. For example, 28% of card 01 issued have a spend band of between $10,000 and 30,000. The analytics server may then determine what percentage of transactions of the card 01 with a spend band of between $10,000 and 30,000 have been cross border (e.g., 6% of the transactions have been registered outside the United States for the card 01 with the spend band of $10,000 to 30,000). The analytics server may then determine the % CP, % CNP, and % eCom for card 01 with the spend band of $10,000 to 30,000. For example, dataset 400 illustrates that in 72% of the transactions associated with card 01 (with a spend band of $10,000 to $30,000) the cardholder has been physically present; and 16% of all transactions associated with said card has been performed by online vendors and providers. In an embodiment, the third party database (e.g., the database or a server associated with the participating card issuing computing system) may transmit the analyzed data to the analytics server. For example, the analytics server may receive % CP and other categories associated with each card and each spend band. In other embodiments, the analytics server may only receive different spend bands associated with each card and a card identifier. In those embodiments, the analytics server may query a database (e.g., an internal database storing all the past transactions) based on the card identifiers and receive past transactions. The analytics server may then analyze the data to determine different characteristics associated with each card. For example, the analytics server may calculate the number of transactions that are not registered within the United States to determine the % XB.

The analytics sever may display dataset 400 by updating the GUI displayed on the client device. In some embodiments, different spend bands are pre-determined by the analytics server. For example, the analytics server may sort all data associated with different payment cards into 5 spend bands (as shown in FIG. 4A-B). The analytics server may also receive the spend bands thresholds from the client. For example, the client may modify one or more spend band limits in order to achieve more granular analysis and results.

At step 340, the analytics server may select a plurality of second electronic cards based on their respective spend band and transaction data satisfying a threshold. The analytics server may sort the dataset 400 as described in step 330. The Analytics server may then select one spend band from each card issued by the participating card issuing computer system. For example, the analytics server may partition some of the card (from the received dataset) into a cluster by selecting the cards based on the number or percentage of cards satisfying a threshold or their respective rank. For example, the analytics server may select card 01 with the spend band of $30,000 and higher because 40% of the card 01 issued are associated with this spend band, which is more than other spend bands associated with card 01. In other embodiments, the analytics server may select the second highest spend band and may use a secondary factor (e.g., based on a factor other than the spend band). For example, the analytics server may select card 02 with the spend band of $10,000 to $30,000 because said spend band is also associated with the lowest cross border transaction percentage and the highest % CP. In another example, the analytics server may select card 03 with the spend band of $10,000 to $30,000 because this spend band has a 30% CNP (e.g., second highest within all the other spend bands of card 04). In other embodiments, the analytics server may also account for other factors such as annual fees or other transaction related fees. In yet other embodiments, the selection algorithm may be modified by the client. For example, the client may override the selection and the analytics server may receive a different selection (e.g., override the selecting made by the analytics server) form the client. The analytics server may display the dataset 400 on the GUI associated with the client device and the client may select a spend band and/or override the selection made by the analytics server.

At step 350, the analytics server may query a third database (e.g., database 260 illustrated in FIG. 2) databases to receive a third dataset, wherein the third dataset comprises data corresponding to a plurality of third electronic cards associated with a plurality of third users comprising at least one of a spend band value and transaction data associated with each selected second electronic card, wherein each third electronic card is associated with a third database within the one or more third databases, wherein each third electronic card is associated with a card identifier and the server is prohibited from sharing the electronic card identifier associated with the each of the third electronic cards with any computing device not authorized by the third database. The analytics server may query a third database (e.g., a database that stores card data and other transaction related information from all card issuing computing systems) to receive data associated with the characteristics of the selected cards (step 340). For example, as illustrated in FIG. 4A-B, the analytics server selects card 01, with a spend ban of $30,000 and higher, using a secondary characteristic of 5% XB. As a result, the analytics server may query and receive all data associated with different issuing computing systems and their respective cards issued that have a spend bands higher than $30,000 and have an XB factor of 5%. In some embodiments, the analytics server may also use the other characteristics (e.g., additional characteristics) associated with the selected card to query the database. For example, in addition to querying for cards with spend bands of $30,000 or higher and XB of 5%, the analytics server may also query for the cards that have CP of 60%. The analytics server may also broaden the query by modifying the range of each characteristic in order to receive a larger sample. For example, the analytics server may request data associated with cards with 10% XB instead of 5%. The widened range will yield a larger sample and may improve the peer benchmark dataset. The analytics server may use a predetermined threshold or use a threshold received from the client to broaden the query terms.

At step 360, the analytics server may generate the peer benchmark dataset, wherein the peer benchmark dataset is a subset of the third dataset, wherein the peer benchmark dataset comprises a plurality of fourth electronic cards comprising a spend band and transaction data, wherein the spend band and transaction data of the plurality of fourth electronic cards correspond to the spend ban and transaction data of the selected plurality of second electronic cards. The analytics server may, upon receiving similar cards from other issuing computing systems in step 350, generate a peer benchmark dataset by querying and storing the BIN6 identifiers associated with all the received cards. Upon identifying the desired cards (e.g., partitioning some of the cards and placing them into a cluster) in step 350, the analytic server may query different BIN6 identifiers associated with the identified cards from the third database. A BIN6 may refer to the first six digits of a card identifier (e.g., card number). The analytics server may freely share the BIN6 associated with each card with other computing device. As explained above, the analytics server may not share any proprietary data associated with specific payment cards with any other party other that the card issuing computer system that has issued said card. However, the analytics server may share the BIN6 number associated with cards with other computer devices because payment cards may not be identified using only their respective BIN6 numbers. The analytics server may generate the peer benchmark dataset using only the BIN6 identifiers and the transaction data associated with those BIN6 identifiers in order to preserve the anonymity of the card holders.

Upon receiving the query results, the analytics server may modify the dataset in order to improve the distribution of the dataset and achieve a better sample size. As illustrated in FIG. 5, the analytics server may receive different cards from different card issuing computing systems (e.g., dataset 500).

For example, the analytics server may receive a total of 367,034 cards issued by five different card issuing computing systems that match the query terms (e.g., spend band of 30,000 or higher and XB characteristic of 5%); 49% of the received cards may belong to card issuer 01; on the other hand, only 2% of the cards may belong to the card issuer 05. The analytics server may only select some of the cards issued by the card issuer 01 in order to generate a better distribution within the peer benchmark dataset. The analytics server may modify the number of cards (issued by each card issuing computing system) within the peer benchmark dataset to a value equal to or below 25% of the total cards within the peer benchmark dataset. For example, by decreasing the number of cards (issued by card issuer 01), the analytics server may distribute the remaining weights among the rest of the card issuers and keep the original ratios under each issuer the same (illustrated by columns 510). In some embodiments, the analytics server may use a coefficient of variance to ensure that the reweighting (e.g., redistributing the number of card as described above) is done in a way that weighted averages for the transaction attributes are within a pre-determined range (e.g., coefficient of variance). For example, as show in FIG. 5, the analytics server may calculate a weighted average for the transaction attributes. In an embodiment, the analytics server may calculate the weighted using the following:

$$\Sigma(\text{Transaction attribute} * \text{Cards})/\Sigma(\text{Cards})$$

The analytics server may also calculate a standard deviation and mean value for the transaction attributes. As illustrated in FIG. 5, the transaction attribute (e.g., SPAC) has a weighted average of 9,208. After redistributing the number of cards, the analytics server may then calculate a new weighted average (using the new redistributed card numbers) and compare the old weighted average with the new weighted average. If the new weighted average satisfies a pre-determined threshold (e.g., coefficient of variance) the analytics server may adjust the card number again and iteratively re-calculate a new distribution. For example, as illustrated in FIG. 5, the analytics server calculates a first weighted average (for the old SPAC values) to be 9,208 and after redistribution of card numbers, the analytics server calculate the new weighted average to be 7,839. The analytics server then compares the first and the second weighted averages (e.g., 15% variance) and determines that said variance does not satisfy the pre-determined coefficient of variance (e.g., 27%).

At step 370, the analytics server may query the third database to receive a transaction attribute dataset comprising the transaction attribute associated with each of the plurality of fourth electronic cards. The analytics server may also, upon querying the third database, receive the transaction attribute dataset. Using the BIN6 identifiers within the generated and modified peer benchmark dataset (e.g., the peer benchmark dataset as described above), the analytics server may query a database (configured to store all transaction data associated with all card from different issuing computer systems, such as an internal database) and request to receive transactions data (e.g., transaction data associated with the transaction attribute received in step 310). For example, if the analytics server receives a request to compare the SPAC with similar cards within the market (in step 310), the analytics server may query the database to receive SPAC data associated with the BIN6 identifiers within the peer benchmark. The analytics server may receive SPAC values for the cards (as illustrated in the dataset 500 and by columns 510).

At step 380, the analytics server may update the GUI on the client device to display the benchmark dataset and the first dataset. The analytics server may update the GUI to display a graphical representation of the peer benchmark dataset and the requested card data.

FIG. 6 illustrates different attributes being compared against different peer benchmarks and displayed on the GUI associated with the client device. For example, GUI 620 comprises a container (e.g., sub interface 600) that represents a comparison between the number of declined transactions for a particular card (e.g., a card issued by the client) with other similar cards in the market. The GUI 620 represents a GUI executed and provided by the analytics server and displayed on the client device. The GUI 620 may be a website operated by the analytics server (as described in step 310). The GUI 620 may comprise one or more containers configured to display one or more comparison graphs and charts. The client may modify the content, position, and/or any other graphical attributes of the containers. For example, a client may designate a container to continuously display a comparison between the number of declined transactions and a particular client card. The graph 603 may represent the number of declined transactions for a card issued by the client (e.g., graph 603 may represent the first database received in step 320), graph 602 may represent the peer benchmark dataset generated by the analytics server, and graph 601 may represent the traditional benchmarks calculated using conventional methods. Furthermore, the specific GUI described within the present disclosure (e.g., GUI containing modifiable container and sub interfaces configured to dynamically display different graphs) provides an easy way to monitor performance of one or more payment cards. In another example, sub interface 610 represents a container within the GUI 620 that illustrates the comparison between spend per active card (SPAC) values associated with a particular card (e.g., a card issued by the client) with other similar cards in the market. The graph 612 may represent the SPAC value for a card issued by the client (e.g., graph 612 may represent the first database received in step 320), graph 611 may represent the peer benchmark dataset generated by the analytics server, and graph 613 may represent the traditional benchmarks calculated using conventional methods. The analytics server may also calculate and display deviation values (e.g., difference between values of the peer benchmark dataset and the first dataset). As illustrated in GUI containers (e.g., sub interface 600 and sub interface 610), the new peer benchmark dataset is considerably more accurate than traditional benchmarks.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

receiving, by a server, from graphical user interface displayed on a client computing device, a request to generate a benchmark dataset, wherein the request comprises at least a first electronic card associated with a plurality of first users, wherein the first electronic card is associated with a first database;

querying, by the server, the first database to receive a first dataset, wherein the first dataset comprises transaction data corresponding to the first electronic card;

upon querying the first database, receiving, by the server, the first dataset;

querying, by the server, a second database to receive a second dataset, wherein the second dataset comprises transaction data corresponding to a plurality of second electronic cards associated with a plurality of second users and further comprises at least one of an account number associated with each second user, electronic card identifiers, account status, and spend band value, associated with each second electronic card, wherein each second electronic card is associated with the second database, wherein the server is prohibited from sharing the electronic card identifier associated with the each of the second electronic cards with any computing device not authorized by the second database;

upon querying the second database, receiving, by the server, the second dataset;

selecting, by the server, a plurality of selected second electronic cards based on their respective spend band value and transaction data satisfying a first threshold;

querying, by the server, one or more third databases to receive a third dataset, wherein the third dataset comprises data corresponding to a plurality of third electronic cards associated with a plurality of third users comprising at least one of a spend band value and transaction data associated with each selected second electronic card, wherein each third electronic card is associated with a third database within the one or more third databases, wherein each third electronic card is associated with a card identifier and the server is prohibited from sharing the electronic card identifier associated with the each of the third electronic cards with any computing device not authorized by the third database;

generating, by the server, the benchmark dataset comprising a plurality of fourth electronic cards comprising a spend band value and transaction data corresponding to the spend band value and transaction data of the plurality of selected second electronic cards, wherein the benchmark dataset is a subset of the third dataset and each fourth electronic card satisfies a second threshold, wherein the benchmark dataset comprises a second card identifier containing at least a portion each third electronic card identifier; and updating, by the server, the graphical user interface on the client computing device to display the benchmark dataset and the first dataset.

2. The method of claim 1, further comprising:

updating, by the server, the graphical user interface to display the first dataset.

3. The method of claim 2, further comprising:

receiving, by the server, from the client computing device, via the graphical user interface a selection of a plurality of second electronic cards.

4. The method of claim 1, wherein the querying the one or more third databases to receive a third dataset is based on at least one of a spend band value and a second value corresponding to the transaction data associated with each second electronic card.

5. The method of claim 4, wherein the second value is received, by the server, from the client computing device.

6. The method of claim 1, wherein the electronic card is a credit card.

7. The method of claim 1, wherein the graphical user interface is a web service executed by the server.

8. The method of claim 1, wherein the graphical user interface is a web service comprising one or more container configured to dynamically display the benchmark dataset, wherein each container is configured to be customized based on preferences received, by the server, from the client computing device.

9. A computer system comprising:
a server configured to:
receive from graphical user interface displayed on a client computing device, a request to generate a benchmark dataset, wherein the request comprises at least a first electronic card associated with a plurality of first users, wherein the first electronic card is associated with a first database;
query the first database to receive a first dataset, wherein the first dataset comprises transaction data corresponding to the first electronic card;
upon querying the first database, receive the first dataset;
query a second database to receive a second dataset, wherein the second dataset comprises transaction data corresponding to a plurality of second electronic cards associated with a plurality of second users and further comprises at least one of an account number associated with each second user, electronic card identifiers, account status, and spend band value, associated with each second electronic card, wherein each second electronic card is associated with the second database, wherein the server is prohibited from sharing the electronic card identifier associated with the each of the second electronic cards with any computing device not authorized by the second database;
upon querying the second database, receive the second dataset;
select a plurality of selected second electronic cards based on their respective spend band value and transaction data satisfying a first threshold;
query one or more third databases to receive a third dataset, wherein the third dataset comprises data corresponding to a plurality of third electronic cards associated with a plurality of third users comprising at least one of a spend band value and transaction data associated with each selected second electronic card, wherein each third electronic card is associated with a third database within the one or more third databases;
generate the benchmark dataset comprising a plurality of fourth electronic cards comprising a spend band value and transaction data corresponding to the spend band value and transaction data of the plurality of selected second electronic cards, wherein the benchmark dataset is a subset of the third dataset and each fourth electronic card satisfies a second threshold, wherein the benchmark dataset comprises a second card identifier containing at least a portion each third electronic card identifier; and
update the graphical user interface on the client computing device to display the benchmark dataset and the first dataset.

10. The computer system of claim 9, wherein the server is further configured to:
update the graphical user interface to display the first dataset.

11. The computer system of claim 10, wherein the server is further configured to:
receive from the client computing device, via the graphical user interface a selection of a plurality of second electronic cards.

12. The computer system of claim 9, wherein the querying the one or more third databases to receive a third dataset is based on at least one of a spend band value and a second value corresponding to the transaction data associated with each second electronic card.

13. The computer system of claim 12, wherein the second value is received from the client computing device.

14. The computer system of claim 9, wherein the electronic card is a credit card.

15. The computer system of claim 9, wherein the portion of the electronic card identifier is a first six digits of the electronic card identifier.

16. The computer system of claim 9, wherein the graphical user interface is a web service executed by the server.

17. The computer system of claim 9, wherein the graphical user interface is a web service comprising one or more containers configured to dynamically display the benchmark dataset, wherein each container is configured to be customized based on preferences received, by the server, from the client computing device.

* * * * *